United States Patent [19]
Dopp et al.

[11] Patent Number: 6,130,272
[45] Date of Patent: Oct. 10, 2000

[54] PROCESS FOR MAKING POWDERED BASE FOR FORMULATING CURABLE LIQUID SILICONE RUBBER COMPOSITIONS

[75] Inventors: Steven F. Dopp, Midland, Mich.; Phillip Joseph Griffith, Llandough, United Kingdom; Jary David Jensen; Herschel Henry Reese, both of Midland, Mich.

[73] Assignee: Dow Corning Corporation, Midland, Mich.

[21] Appl. No.: 09/181,978

[22] Filed: Oct. 29, 1998

Related U.S. Application Data

[63] Continuation-in-part of application No. 08/582,794, Jan. 4, 1996, abandoned.

[51] Int. Cl.$^7$ ...................................................... C08K 9/06
[52] U.S. Cl. ........................... 523/212; 523/213; 523/209; 524/588
[58] Field of Search ............................. 24/588; 523/209, 523/212, 213

[56] References Cited

U.S. PATENT DOCUMENTS

| | | | |
|---|---|---|---|
| 3,268,473 | 8/1966 | Brown | 260/37 |
| 3,635,743 | 1/1972 | Smith | 106/288 Q |
| 3,824,208 | 7/1974 | Link et al. | 260/375 |
| 4,898,898 | 2/1990 | Fitzgerald et al. | 523/351 |
| 5,153,238 | 10/1992 | Bilgrien et al. | 523/211 |

FOREIGN PATENT DOCUMENTS 2-102007  4/1990  Japan.

*Primary Examiner*—Margaret G. Moore
*Attorney, Agent, or Firm*—William F. Boley; Jennifer S. Warren

[57] ABSTRACT

A process for making a flowable powdered base suitable for use in the formulation of liquid silicone rubber compositions that can be cured to form silicone elastomers. The process comprises (A) fluidizing a reinforcing silica filler in a high-shear mixer, (B) maintaining the content of the mixer at a temperature below about 60° C. while adding to the mixer a silylating agent, a nitrogen containing compound to facilitate the silylation reaction, and water thereby forming an essentially homogeneous mixture comprising a treated reinforcing silica filler; (C) adding a polydiorganosiloxane having a viscosity of about 0.03 to 300 Pa.s at 25° C. to the mixer and forming a flowable powdered base having an average particle size of from about 1 to 1000 microns, and (D) heating the flowable powdered base under conditions sufficient to remove volatiles.

18 Claims, No Drawings

PROCESS FOR MAKING POWDERED BASE FOR FORMULATING CURABLE LIQUID SILICONE RUBBER COMPOSITIONS

This application is a C-I-P of Ser. No. 08/582,794 filed Jan. 4, 1996, abandoned.

BACKGROUND OF INVENTION

The present invention is a process for making a flowable powdered base suitable for use in the formulation of liquid silicone rubber compositions that can be cured to form silicone elastomers. The process comprises (A) fluidizing a reinforcing silica filler in a high-shear mixer, (B) maintaining the content of the mixer at a temperature below about 60° C. while adding to the mixer a silylating agent, a nitrogen containing compound to facilitate the silylation reaction, and water thereby forming an essentially homogeneous mixture comprising a treated reinforcing silica filler; (C) adding a polydiorganosiloxane having a viscosity of about 0.03 to 300 Pa.s at 25° C. to the mixer and forming a flowable powdered base having an average particle size of from about 1 to 1000 microns, and (D) heating the flowable powdered base under conditions sufficient to remove volatiles.

Curable liquid silicone rubber (LSR) compositions are particularly useful for the injection molding of intricate silicone rubber parts. The LSR compositions offer advantages over convention curable high-consistency silicone rubber compositions, including faster mold cycling times and less deflashing of molded components. Generally, LSR compositions are considered to be those curable silicone compositions which can be pumped by convention pumping apparatuses. Curable LSR compositions usually comprise a polydiorganosiloxane mixture having a viscosity within a range of about 0.03 to 100 Pa.s at 25° C., silica reinforcing filler, and other additives and processing aids.

Curable LSR compositions have traditionally been formed by adding the polydiorganosiloxane, the silica reinforcing filler, and other additives and processing aids to a mixer such as a dough mixer. Normally it takes a dough-mixer from a minimum of about 6 hours to a maximum of 48 hours to form a homogeneous mass having the properties of a LSR that when catalyzed and cured results in a silicone rubber having acceptable physical characteristics.

An objective of the present process is to provide a process which can form a flowable powder base for formulating a LSR composition in a very short time. A second objective of the present process is to provide a flowable powder base which can be further processed easily. A third objective is to provide a flowable powder base which can subsequently be massed to form a curable LSR composition. A fourth objective is to provide a flowable powder base which can be used to formulate curable LSR compositions which can be cured to form silicone rubbers having physical properties at least comparable to LSR compositions prepared by conventional methods.

Link et al., U.S. Pat. No. 3,824,208, describe a process where a silica filler is compounded with a polydiorganosiloxane having a viscosity of between 1 and 200,000 Pa.s at 25° C. to form a free-flowing particulate mixture. Link et al. teach that the filler and polymer may be added simultaneous to the mixing apparatus or the polymer may be added to the mixing apparatus followed by addition of the filler. Link et al. also teach that the filler can be a treated filler.

JP (Kokai) 2/102007 teaches a process where a polydiorganosiloxane having a viscosity of about 100 Pa.s at 25° C., an inorganic filler, and an auxiliary material are evenly dispersed and made into a flowable powder by a high speed mechanical shear method.

Fitzgerald et al., U.S. Pat. No. 4,898,898, describe a process for providing polymer-densified silica fillers. The process is describes as consisting of mixing a silicone polymer having a viscosity within a range from about 1 to 200,000 Pa.s at 25° C. with a reinforcing filler and an extending filler under conditions resulting in a dense, free-flowing particulate mixture.

Bilgrien et al., U.S. Pat. No. 5,153,238, describe forming a flowable powder by blending a high consistency polydiorganosiloxane into a quantity of fluidized reinforcing filler at a temperature within a range of from 100° C. to 200° C. Bilgrien et al. teach the filler can be treated with about 10 to 45 weight percent, based on the weight of the silica, of an anti-creeping agent either prior to or during the blending process.

Brown, U.S. Pat. No. 3,268,473, teaches the use of ammonium carbonate or ammonium bicarbonate as an additive to compositions comprising a polydiorganosiloxane, a reinforcing filler, and a hydroxylated organosilicon compound as an anti-creeping agent.

Smith, U.S. Pat. No. 3,635,743, teaches an improved reinforcing silica filler can be made by first treating the filler with a nitrogen containing compound selected from a group consisting of ammonia, primary amines, and aminoxy compounds and then treating the filler with a silylating agent.

SUMMARY OF INVENTION

The present invention is a process for making a flowable powdered base suitable for use in the formulation of liquid silicone rubber compositions that can be cured to form silicone elastomers. The process comprises (A) fluidizing a reinforcing silica filler in a high-shear mixer, (B) maintaining the content of the mixer at a temperature below about 60° C. while adding to the mixer a silylating agent, a nitrogen containing compound to facilitate the silylation reaction, and water thereby forming an essentially homogeneous mixture comprising a treated reinforcing silica filler; (C) adding a polydiorganosiloxane having a viscosity of about 0.03 to 300 Pa.s at 25° C. to the mixer and forming a flowable powdered base having an average particle size of from about 1 to 1000 microns, and (D) heating the flowable powdered base under conditions sufficient to remove volatiles.

DESCRIPTION OF INVENTION

The present invention is a process for making a flowable powdered base suitable for formulating a curable liquid silicon rubber composition. The process comprises: (A) fluidizing a reinforcing silica filler in a high-shear mixer; then (B) maintaining the content of the mixer at a temperature below about 60° C. while adding to the mixer a silylating agent, a nitrogen containing compound selected from a group consisting of ammonia, ammonia salts, non-silylated primary amines, and non-silylated aminoxy compounds, in amounts sufficient to treat the silica, thereby forming an essentially homogeneous mixture comprising a treated reinforcing silica filler; then (C) adding to the mixer a polydiorganosiloxane having a viscosity within a range of about 0.30 to 300 Pa.s at 25° C. and forming a flowable powdered base having an average particle size within a range of about one to 1000 microns; and (D) heating the flowable powdered base under conditions sufficient to remove volatiles.

The present invention is a process for making a flowable powdered base suitable for use in the formulation of liquid silicon rubber (LSR) compositions that can be cured to form silicone elastomers. The process is conducted in a high-shear mixer which is capable of dispersing, mixing, and maintaining the ingredients added to the mixer as particles which are maintained in suspension in the mixer. The present process takes advantage of the increased rate of mass transfer and heat transfer that results from the large surface area of the suspended particles. This increase in mass transfer and heat transfer allows for a dramatic reduction in the time required to prepare a base suitable for use in the formulation of LSR compositions, when compared to convention mixing methods.

The high-shear mixer can be any mixer capable of dispersing and maintaining the added ingredients in a finely divided suspended state at a controlled temperature. Suitable mixers include, for example, Waring(R) blenders containing a high speed shearing blade at the bottom of a vertically oriented conical chamber and mixers manufactured by Rheinstahl Henschel AF, Kassel, Germany. Mixers manufactured by Littleford Bros. Inc., Florence, Ky. are preferred mixing devices. These mixers are referred to as "plowshare" mixers due to the presence of at least one triangular or "T"-shaped blade, referred to as a plow blade, positioned in a horizontally-oriented cylindrical mixing chamber. The plow blade rotates on the horizontal axis of the chamber with the edge of the blade close to the perimeter of the chamber. Also present in the mixer are one or more high speed shearing blades referred to as chopper blades. The plow blades are believed to not only serve the function of keeping the ingredients suspended in the mixer, but also to facilitate agglomeration of the formed particles to the desired final particle size.

The speed of the plow blade required to maintain the particles formed in the present process in suspension is typically from about 30 to about 200 revolutions per minutes, and is dependent upon the capacity of the mixing chamber and the particle size range of the final powder. A speed of from about 80 to about 180 revolutions per minute is preferred when using a 130 liter-capacity mixer chamber of the above described Littleford design.

In the preferred mixer of the Littleford design, it is believed that the speed of the chopping blades should by between about 2000 to about 4000 revolution per minutes. To minimize processing time it is preferred to use the longest chopper blades that will not interfere with rotation of the plow blades located on either side of the chopper blades.

The present inventors have found that the order of addition of ingredients to the mixer is critical for forming a powdered base which can be formulated into a curable liquid silicon rubber composition having acceptable handling characteristic and which can be cured to a silicone elastomer having acceptable physical characteristics. Therefore, in Step (A) a reinforcing silica filler is fluidized in the mixer. By "fluidized" it is meant that the filler is suspended in the mixer in a finely divided particulate form.

The type of reinforcing silica filler use in the present process is not critical and can be any of those reinforcing silica filler known in the art. The reinforcing silica filler can be, for example, a precipitated or pyrogenic silica having a surface area of at least 50 square meters per gram ($M^2/g$). More preferred is when the reinforcing silica filler is a precipitated or pyrogenic silica having a surface area within a range of about 150 to 500 $M^2/g$. The most preferred reinforcing silica filler is a pyrogenic silica have a surface area of about 225 to 270 $M^2/g$. The pyrogenic silica filler can be produced by burning silanes, for example, silicon tetrachloride or trichlorosilane as taught by Spialter et al. U.S. Pat. No. 2,614,906 and Hugh et al. U.S. Pat. No. 3,043,660.

During the conduct of Step (B) of the process the content of the mixer is maintained at a temperature below about 60° C. Preferred is when the content of the mixer is maintained at a temperature within a range of about 20° C. to 50° C. The method of maintaining the content of the mixer within the described temperature ranges is not critical. For example, at least a portion of the mixer wall can be contacted with a jacket though which a heat transfer media such as water or air is circulated. The order of addition of the ingredients added in Step (B) is not critical. The ingredients can be added to the mixer separately or as one or more mixtures. Preferred is when the ingredients are sprayed individually into the mixer. The amounts of ingredients added in Step (B) will be those sufficient to treat the silica.

A small amount of water, for example about one to eight parts by weight of water is provided to the mixer per each 100 parts by weight of reinforcing silica filler. At least a portion of the total water requirement may be provided to the mixer in combination with the reinforcing silica filler. Preferred is when about three to five parts by weight of water is provided to the mixer.

A nitrogen containing compound selected from a group consisting of ammonia, ammonium hydroxide, ammonium salts, non-silylated primary amines and non-silylated aminoxy compounds is added to the mixer containing the fluidized reinforcing silica filler. In addition to the nitrogen containing compound being ammonia or ammonium hydroxide; the nitrogen containing compound can be an ammonium salt such as ammonium carbonate or ammonium bicarbonate; a primary amine such as isopropyl amine, or a hydroxylamine such as diethylhydroxylamine. The preferred nitrogen containing compound is ammonium hydroxide.

Also added to the mixer in Step (B) is a silylating agent effective in silylating the reinforcing silica filler. Useful silylating agents are found, for example, in Klebe, U.S. Pat. No. 3,397,220, incorporated by reference herein.

The silylating agent can be, for example, triorganosilylamines as described by formula $(R_3Si)_aH_bNR_{3-a-b}$, where each R is independently selected from a group consisting of alkyls comprising one to 20 carbon atoms, alkenyls comprising two to 20 carbon atoms, cycloalkyls comprising 3 to 20 carbon atoms, and aralkyls. The substituent R can be substituted with a halogen such as fluorine or chlorine. The substituent R can be, for example, methyl, ethyl, propyl, tertiary butyl, chloromethyl, perfluoropropyl, vinyl, allyl, cyclopentyl, cyclohexyl, phenyl, tolyl, naphthyl, chlorophenyl, benzyl, and gamma-tolylpropyl. Specific examples of triorganosilylamines include, trimethylisopropylamine, trimethylsilylamine, dimethylphenylsilylamine, and dimethylvinylsilylamine.

The silylating agents useful in the present process can include triorganosilylmercaptons and triorganosilylacylates, where the triorganosilyl groups are as described above for the triorganosilylamines. The silylating agents can include triorganosilylaminoxy compounds such as diethylaminotrimethylsilane and diethylaminoxydimethylphenylsilane.

Other silylating compounds which may be of use include disilyl compounds such as disiloxanes, for example, hexamethyldisiloxane, 1,3-divinyltetramethyldisiloxane, 1,3-diphenyltetramethyldisiloxane; silazanes such as hexamethyldisilazane, 1,3-divinyltetramethyldisilazane, and 1,3-diphenylhexamethyldisilazane. The preferred silylating agent is selected from a group consisting of hexamethyldisilazane and 1,3-divinyltetramethyldisilazane. Even more preferred is when the silylating agent is a mixture comprising as a major portion hexamethyldisilazane and as a minor portion 1,3-divinyltetramethyldisilazane.

In Step (B) an essentially homogeneous mixture comprising a treated reinforcing silica filler is formed. By "essentially homogeneous" it is meant that the ingredients added in Step (B) are dispersed throughout the fluidized reinforcing silica filler adequate to ensure treatment of the surface of the majority of the silica particles. In the preferred embodiment of the present process the reinforcing silica filler and ingredients added in Step (B) are contacted for a period of about 30 seconds to five minutes to ensure formation of an essentially homogeneous mixture.

After the completion of Step (B), about 20 to 400 parts by weight of a polydiorganosiloxane having a viscosity at 25° C. of about 0.03 to 300 Pa.s is added to mixer per 100 parts by weight of the reinforcing silica filler. Preferred is when about 30 to 100 parts by weight of the polydiorganosiloxane is added to the mixer on the same basis. Preferred is when the polydiorganosiloxane has a viscosity at 25° C. within a range of about 0.03 to less than 100 Pa.s. The polydiorganosiloxane can be represented by the general formula $X(R^1R^2SiO)_nX$ where $R^1$ and $R^2$ represent identical or different monovalent substituted or unsubstituted hydrocarbon radicals, the average number of repeating units in the polymer, represented by n, is selected to provide the desired viscosity, and the terminal group X represents a saturated or ethylenically unsaturated hydrocarbon radical or a hydroxyl group. The type of group represented by X is determined by the curing reaction used to convert the polydiorganosiloxane to a cured elastomer. For example, when the composition is to be cured by a hydrosilylation reaction with an organohydrogensiloxane or a vinyl-specific peroxide, X is typically vinyl or other alkenyl radical.

The hydrocarbon radicals represented by $R^1$ and $R^2$ include alkyls comprising one to 20 carbons atoms such as methyl, ethyl, and tertiary-butyl; alkenyl radicals comprising one to 20 carbon atoms such as vinyl, allyl, and 5-hexenyl; cycloalkyl radicals comprising three to about 20 carbon atoms such as cyclopentyl and cyclohexyl; and aromatic hydrocarbon radicals such as phenyl, benzyl, and tolyl. The $R^1$ and $R^2$ can be substituted with, for example, halogens, alkoxy, and cyano groups. The preferred hydrocarbon radicals are alkyls containing about one to four carbon atoms, phenyl, and halogen-substituted alkyls such as 3,3,3-trifluoropropyl. Most preferably $R^1$ represents a methyl radical, $R^2$ represents at least one of methyl, phenyl and 3,3,3-trifluoropropyl radicals, and X represents methyl or vinyl, and optionally one or more of the $R^2$ radicals is alkenyl. The preferred polydiorganosiloxane is a dimethylvinylsiloxy endblocked polydimethylsiloxane having a viscosity within a range of about 0.3 to less than 100 Pa.s.

The polydiorganosiloxane of the present process can be a homopolymer, a copolymer or a mixture containing two or more different homopolymers and/or copolymers. When the composition prepared by the present process is to be cured by a hydrosilylation reaction, at least a portion of the polydiorganosiloxane can be a copolymer where X represents an alkenyl radical and a portion of the $R^2$ radicals on non-terminal silicon atoms are optionally ethylenically unsaturated radicals such as vinyl and hexenyl.

Methods for preparing polydiorganosiloxanes having a viscosity within a range of about 0.03 to 300 Pa.s at 25° C. are well known and do not require a detailed discussion in this specification. One method for preparing these polymers is by the acid or base catalyzed polymerization of cyclic polydiorganosiloxanes that typically contain three or four siloxane units per molecule. A second method comprises replacing the cyclic polydiorganosiloxanes with the corresponding diorganodihalosilane(s) and an acid acceptor. Such polymerization are conducted under conditions that will yield the desired molecular weight polymer.

In Step (C) mixing is continued until a flowable powder having an average particle size of from about one to 1000 microns is produced. One way of following the reduction and subsequent decrease in particle size of the content of the mixer is to monitor the amount of electrical power consumer by the motor(s) driving the chopper blades as a function of time. The power consumption level increases sharply following addition of the polydiorganosiloxane and reaches a maximum when all the polydiorganosiloxane has entered the mixer chamber. For a 130 L capacity Littleford type mixer this can be about one to 20 minutes. There is a noticeable leveling off, or plateau, in the downward slope of the power consumption curve for the chopper motor(s) that occurs from about two to 50 minutes after addition of the polydiorganosiloxane. The time till this leveling off occurs depends at least in part on the capacity of the mixer chamber and the speed of the plow and chopper blades. The plateau in the power consumption curve of the chopper blade motor has been found to correspond to the minimum particle size of the flowable powder base. Beyond this plateau the power consumed by the chopper blade motors begins to increase. If the blending operation is allowed to proceed to the point where the power consumption rate of the chopper blade motors begins to increase, the average particle size of the flowable powder base begins to increase as a result of particle agglomeration.

In Step (D) the flowable powdered base prepared in Step (C) is heated under conditions adequate to remove volatiles. The conditions for removing volatiles should be such that unreacted treating agents as added in Step (B) and by-products of the reaction of the treating agents with the reinforcing silica filler are essentially removed from the flowable powdered base. By "essentially removed" it is meant that the volatiles in the flowable powdered base are reduced to a level where they do not significantly effect shelf life of the flowable powdered base or shelf life or handling characteristics of curable liquid silicone rubber compositions prepared therefrom or the physical properties of the cure silicone elastomers prepared therefrom. Although not limiting, it is preferred that Step (D) be performed in the high-shear mixer, since this allows for high mass and heat transfer and short treatment times. When Step (D) is performed, for example, in a Littleford type mixer the flowable powder can be heated at a temperature within a range of about 100° C. to 200° C. for about 10 to 60 minutes under vacuum to remove volatiles.

After the completion of Step (D) optional ingredients may be added to the flowable powdered base either using the same mixing apparatus or during massing operations as described below, which ever mixing method is appropriate. The additional ingredients can include extending fillers such as quartz, calcium carbonate, and diatomaceous earth; pigments such as iron oxide and titanium oxide, electrically conducting fillers such as carbon black and finely divided metals, heat stabilizers such as hydrated ceric oxide, flame retardants such as antimony compounds, hydrated aluminum oxide, magnesium compounds, halogenated hydrocarbon adhesion promoters, and reinforcing agents such as resinous organosiloxane copolymers.

Curable liquid silicone rubber compositions in the form of flowable powders can be prepared by blending the flowable powdered base prepared by the present method with any of the curing agents and catalysts conventionally used to cure polydiorganosiloxane compositions. The blending can be accomplished using the same type of high-shear mixer used to prepare the initial flowable powdered base.

When it is desired to convert the curable LSR composition to an elastomer, the flowable powdered base is converted to a conventional LSR base by compressing and fusing the powdered particles. This fusion or massing of the powder particles can be carried out using any of the equipment conventionally employed to process and fabricate LSR bases. Suitable equipment can include two- and three-roll mills, sigma blade mixers, extruders, and screw-type compounders.

Alternatively, the curing agents can be added during the massing process. Additional polydiorganosiloxane can also be added to the composition at this time.

The curable LSR compositions prepared using the flowable powdered base prepared by the present process can be cured using any of the conventional curing agents and catalyst used to cure polydiorganosiloxane polymers to form silicone elastomers. One class of curing agent suitable to form the curable LSR compositions are organic peroxides. The organic peroxides can be those typically referred to as vinyl-specific, and which require the presence of vinyl or other ethylenically unsaturated hydrocarbon substituent in the polydiorganosiloxane. Vinyl-specific peroxides which may be useful as curing agents in the curable liquid silicone rubber compositions include alkyl peroxides such as 2,5-bis (t-butylperoxy)-2,3-dimethylhexane. The organic peroxide can be those referred to as non-vinyl specific and which react with any type of hydrocarbon radical to generate a free radical.

The curable LSR compositions prepared from the flowable powdered base of the present process can also be cured by a hydrosilylation reaction. In this instance the flowable powdered base, before, during or after massing is blended with an organohydrogensiloxane crosslinker containing at least two and preferably at least three silicon-bonded hydrogen atoms per molecule and a platinum-containing catalyst. It is preferred that the blending of the crosslinker and catalyst be conducted at a temperature below about 40° C. to maximize the working time of the composition. A platinum catalyst inhibitor can also be included to further increase working time.

Examples of platinum-containing hydrosilylation catalysts useful in the present process include platinum and compounds thereof and platinum black. Examples of platinum catalyst which may be useful in the curable liquid silicone rubber composition are described for example, in Onopchenko et al., U.S. Pat. No. 4,578,497; Lamoreaux, U.S. Pat. No. 3,220,972; and Speier et al., U.S. Pat. No. 2,823,218 all of which are incorporated here by reference.

The platinum catalyst can be, for example, chloroplatinic acid, chloroplatinic acid hexahydrate, a complex of chloroplatinic acid with sym-divinyltetramethyldisiloxane, dichloro-bis(triphenylphosphine)platinum(II), dicarbonyldichloroplatinum(II), platinum chloride, and platinum oxide.

A preferred platinum compound is chloroplatinic acid, which may be dissolved in a suitable solvent such as an alcohol containing from one to four carbon atoms. The chloroplatinic acid can be present as the free acid or as a complex with a liquid ethylenically unsaturated compound such as an olefin or an organosiloxane containing ethylenically unsaturated hydrocarbon radicals bonded to silicon. Complexes of chloroplatinic acid with such organosiloxanes are described, for example, in Willing, U.S. Pat. No. 3,419,593, which is incorporated by reference as teaching preferred catalysts. The most preferred platinum catalyst is a neutralized complex of chloroplatinic acid or platinum dichloride with sym-divinyltetramethyldisiloxane.

The concentration of platinum-containing hydrosilylation catalyst useful in the present curable LSR composition can be that providing about 0.1 to 500 parts by weight of platinum metal per million parts of the combined weight of the flowable powdered base and the organohydrogensiloxane crosslinker. It is preferred that the platinum-containing hydrosilylation catalyst provide about one to 50 parts by weight of platinum metal on the same basis.

Because the curable liquid silicone rubber composition can begin to cure even at temperatures as low as 25° C., even in the presence of a platinum catalyst inhibitor, if the compositions are to be stored for any length of time prior to being cured it may be desirable to package the compositions in two or more containers such that the organohydrogensiloxane and the platinum-containing hydrosilylation catalyst are in separate containers.

The following examples are provided to illustrate the present invention. These examples are not intended to limit the scope of the claims herein.

For the described examples, the high-shear mixer used was identified as model FM-130D manufactured by Littleford Brothers, Inc., Florence, Ky. The mixer consisted of a 130 liter-capacity cylindrical mixing chamber equipped with four "T"-shaped scraper blades (referred to as plow blades) attached to a shaft located on the central axis of the chamber. The edge of each blade rotated at a distance of 0.6 cm from the perimeter of the mixing chamber. From the wall of the mixing chamber projected a shaft on which was mounted a conical array of ten chopper blades arranged in sets of two mounted at an angle of 90° with respect to one another. The array consisted of two sets of two 6 inch diameter blades, one set of two 7 inch diameter blades and one set of two 9 inch diameter blade. The smallest diameter blades were located closest to the wall of the mixer chamber.

The top of the mixer chamber contained a cylindrical stack though which material could enter or leave the chamber. The mixer chamber was equipped with a jacket that allowed the contents to be heated using steam or cooled using water or other heat transfer media. Unless otherwise indicated in the following examples, all of the compositions were prepared using a chopper blade speed of 3600 RPM and a plow blade speed of 170 RPM. All viscosities reported in the Examples are as measured at 25° C.

EXAMPLE 1.

A flowable powdered base for formulating a liquid silicone rubber was formulated by pretreating of reinforcing silica filler in a high-shear mixer at a temperature below 60° C. Into the mixing chamber of the high-shear mixer, as described above, was added 36 parts by weight of a reinforcing silica filler (Cab-O-Sil™ S-17, Cabot Corporation, Tuscola, Ill.) having a surface area of 250 $M^2/g$. The mixer was purged with nitrogen and then power applied for about 15 seconds to suspend the silica. Either 0.7 or 3.05 parts by weight of ammonium hydroxide as specified in Tables 2 and 3 was sprayed into the mixing chamber. Then, about 0.3 parts by weight of 1,3-divinyltetramethyldisilazane, 12 parts by weight of hexamethyldisilazane, and 3.9 parts by weight of water were sprayed into the mixing chamber. The contents of the mixer were mixed for about 10 minutes. About 39.6 parts by weight of a 55 Pa.s dimethylvinylsiloxy endblocked polydimethylsiloxane fluid was sprayed into the mixing chamber and mixing continued for an additional ten minutes, with the temperature of the mixing chamber allowed to rise during this mixing step. The internal temperature of the mixing chamber was brought to 130° C. and a vacuum applied to remove volatiles. The product of this process was a free-flowing powder.

The free-flowing powder was massed in a Baker Perkins mixer at a temperature of 160° C. in the presence of additional 55 Pa.s dimethylvinylsiloxy endblocked polydimethylsiloxane fluid to provide a weight ratio of the siloxane fluid to reinforcing silica filler of 1.1 in the massed master batch. Mixing was continued for about seven minutes under vacuum to remove volatiles. The master batch was further cutback with the 55 Pa.s dimethylvinylsiloxy endblocked polydimethylsiloxane fluid and 0.35 Pa.s dimethylvinylsiloxy endblocked polydimethylsiloxane fluid having pendant vinyl substitution and a total vinyl content of two mole percent, to form a silicone rubber base composition. The final concentration of these two siloxane fluids in the curable silicone rubber composition prepared from this base composition is provided in Table 1. The silicone rubber base composition was cooled to room temperature. A curable silicone rubber composition was prepared on a three-roll mill by adding to the base composition: methylhydrogensiloxane crosslinker, platinum catalyst, methyl butynol as cure inhibitor, and a low-viscosity dimethylhydrogensiloxy endblocked polydimethylsiloxane fluid as a mold release agent, as described in Table 1.

TABLE 1

Composition of Curable Silicone Rubber

| Weight Parts | Description |
|---|---|
| 100 | 55 Pa · s Dimethylvinylsiloxy endblocked polydimethylsiloxane |
| 13.7 | 0.35 Pa · s Dimethylvinylsiloxy endblocked polydimethylsiloxane fluid having pendant vinyl substitution and a total vinyl content of two mole percent |
| 0.34 | Divinyltetramethyldisilazane |
| 13.7 | Hexamethyldisilazane |
| 41.0 | Silica (Cab-O-Sil S-17) |
| 4.5 | Water |
| 2.9 | 5 mPa · s Methylhydrogensiloxane having 0.76 weight percent hydrogen substituted on silicon atoms |
| 0.2 | Neutralize reaction product of chloroplatinic acid and sym-divinyltetramethyldisilazane (0.63 weight percent platinum) |
| * | Ammonium hydroxide as described in Table 2 and 3 |

The extrudability of curable silicone rubber compositions as described in Table 1 were tested at the times described in Table 2 by extruding the composition through a 3.2 mm diameter orifice of a die under a pressure of 620 kPa. In Table 2 the concentration of ammonium hydroxide is reported as the weight parts added to the high-shear mixer during preparation of the flowable powdered base.

TABLE 2

Extrudability of Curable Silicone Rubber Composition Prepared From Powdered Silicone Rubber

| | NH$_4$OH | Extrusion Rate (g/min.) | |
|---|---|---|---|
| Run No. | (parts) | 1 h | 24–72 h |
| 2-1 | 0.7 | 88 | 77 |
| 2-2 | 0.7 | 90 | 91 |
| 3-1 | 3.1 | 75 | 74 |
| 3-2 | 3.1 | 77 | 74 |

Samples of the curable silicone rubber compositions as described in Tables 1 and 2 were cured at 150° C. for five minutes and were tested for physical properties by standard methods.

The test methods and results are described in Table 3.

TABLE 3

Physical Properties

| | | Run No. | | | |
|---|---|---|---|---|---|
| Property | Test Method | 2-1 | 2-2 | 3-1 | 3-2 |
| Durometer (Shore A) | ASTM D2240 | 48 | 50 | 48 | 47 |
| Elongation, % | ASTM 412 | 708 | 624 | 632 | 634 |
| Tensile, MPa | ASTM 412 | 10.0 | 9.4 | 9.4 | 9.5 |
| Modulus (100%), MPa | ASTM 412 | 1.5 | 1.6 | 1.8 | 1.6 |
| Tear (Die B), kN/m | ASTM 625 | 45 | 46 | 46 | 47 |

EXAMPLE 2.

(Comparison example) A base composition was prepared and cured into an elastomer as described in Example 1, with the exception that pretreatment of the reinforcing silica filler was conducted at a temperature of 100° C. The extrudability of the curable silicone rubber composition was tested as described in Example 1 and the results are described in Table 4. The curable silicone rubber composition was cured at 150° C. for five minutes and the physical properties tested. The test methods and results are described in Table 5.

TABLE 4

Extrudability of Curable Silicone Rubber Composition

| | NH$_4$OH | Extrusion Rate (g/min.) | |
|---|---|---|---|
| Run No. | (parts) | 1 h | 24–72 h |
| 209 | 0.7 | 110 | 104 |

TABLE 5

Physical Properties

| Property | Test Method | Run No. 209 |
|---|---|---|
| Durometer (Shore A) | ASTM D2240 | 43 |
| Elongation, % | ASTM 412 | 482 |
| Tensile, MPa | ASTM 412 | 7.4 |
| Modulus (100%), MPa | ASTM 412 | 1.4 |
| Tear (Die B), kN/m | ASTM 625 | 37 |

EXAMPLE 3.

(Reference example) A base for formulating a silicone rubber was formulated by simultaneous adding all of the components to a high-shear mixer and mixing at a temperature of 55° C. Into the mixing chamber of a high-shear mixer, as described above was added 36 parts by weight of a reinforcing silica filler (Cab-O-Sil S-17). The mixer was purged with nitrogen and then power applied for about 15 seconds to suspend the silica. About 0.7 parts by weight of ammonium hydroxide, 0.3 parts by weight of 1,3-divinyltetramethyldisilazane, 12 parts by weight of hexamethyldisilazane, 3.9 parts by weight of water, and 39.6 parts by weight of a 55 Pa.s dimethylvinylsiloxy endblocked polydimethylsiloxane fluid were sprayed into the mixing chamber and mixing continued for an additional seven minutes. The temperature of the content in the mixing chamber was kept at about 55° C. After the seven minute mixing period, the content of the mixer was brought to 130° C. and a vacuum applied to remove volatiles. The product of this process was a heterogeneous non-flowable siloxane base.

The base material was massed in a Baker Perkins mixer and cutback as described in Example 1. A curable silicone rubber base composition was prepared as described in Example 1 with the final composition being as described in Table 1. The extrudability of the curable silicone rubber composition was tested by the method described in Example 1 and the results of this testing are described in Table 6. The curable silicon rubber composition was cured at 150° C. for five minutes and the physical properties tested. The test methods and results of this testing are reported in Table 7.

TABLE 6

Extrudability of Curable Silicone Rubber Composition

| Run No. | NH₄OH (parts) | Extrusion Rate (g/min.) 1 h | 24–72 h |
| --- | --- | --- | --- |
| 208 | 0.7 | 11 | 10 |

TABLE 7

Physical Properties

| Property | Test Method | Run No. 208 |
| --- | --- | --- |
| Durometer (Shore A) | ASTM D2240 | 60 |
| Elongation, % | ASTM 412 | 442 |
| Tensile, MPa | ASTM 412 | 7.9 |
| Modulus (100%), MPa | ASTM 412 | 3.1 |
| Tear (Die B), kN/m | ASTM 625 | 49 |

We claim:

1. A process for making a flowable powdered base for formulating a curable liquid silicone rubber composition, the process comprising:
   (A) fluidizing a reinforcing silica filler in a high-shear mixer; then
   (B) maintaining the content of the mixer at a temperature below about 60° C. while adding to the mixer a silylating agent, a nitrogen containing compound selected from a group consisting of ammonia, ammonia salts, non-silylated primary amines, and non-silylated aminoxy compounds, and water in amounts sufficient to treat the silica, thereby forming an essentially homogeneous mixture comprising a treated reinforcing silica filler; then
   (C) adding to the mixer a polydiorganosiloxane having a viscosity within a range of about 0.03 to 300 Pa.s at 25° C. and forming a flowable powdered base having an average particle size within a range of about one to 1000 microns; and
   (D) heating the flowable powdered base under conditions sufficient to remove volatiles.

2. A process according to claim 1, where the reinforcing silica filler has a surface area within a range of about 225 to 270 $M^2/g$.

3. A process according to claim 1, where during conduct of steps (A) and (B) the content of the mixer is maintained at a temperature within a range of about 20° C. to 50° C.

4. A process according to claim 1, where about three to five parts by weight of water per 100 parts by weight of the reinforcing silica filler is added to the mixer in Step (B).

5. A process according to claim 1, where the nitrogen containing compound is ammonium hydroxide.

6. A process according to claim 5 where the amount of ammonium hydroxide added in Step B is about 0.7 to 3.1 parts by weight for every 100 parts by weight of reinforcing silica filler.

7. A process according to claim 1, where the silylating agent is selected from a group consisting of hexamethyldisilazane, 1,3-divinyltetramethyldisilazane, and mixtures thereof.

8. A process according to claim 7, where the silylating agent is a mixture comprising as a major portion hexamethyldisilazane and as a minor portion 1,3-divinyltetramethyldisilazane.

9. A process according to claim 8 where the silylating agent is a mixture comprising about 0.3 part by weight 1,3-divinyltetramethyldisilazane and about 12 parts by weight of hexamethyldisilazane for every 100 parts by weight of reinforcing silica filler.

10. A process according to claim 1, where about 20 to 400 parts by weight of the polydiorganosiloxane is added to the mixer per 100 parts by weight of the reinforcing silica filler.

11. A process according to claim 1 where about 30 to 100 parts by weight of the polydiorganosiloxane is added to the mixer per 100 parts by weight of the reinforcing silica filler.

12. A process according to claim 1, where the polydiorganosiloxane has a viscosity at 25° C. within a range of about 0.03 to less than 100 Pa.s.

13. A process according to claim 1, where about 30 to 100 parts by weight of the polydiorganosiloxane is added to the mixer per 100 parts by weight of the reinforcing silica filler and the polydiorganosiloxane has a viscosity at 25° C. within a range of about 0.03 to less than 100 Pa.s.

14. A process according to claim 1, where the polydiorganosiloxane is dimethylvinylsiloxy endblocked polydimethylsiloxane.

15. A process according to claim 12, where the polydiorganosiloxane is dimethylvinylsiloxy endblocked polydimethylsiloxane.

16. A process according to claim 1, where in Step (D) the flowable powdered base is heated at a temperature within a range of about 100° C. to 200° C.

17. A process for making a flowable powdered base for formulating a curable liquid silicone rubber composition, the process comprising:
   (A) fluidizing 100 parts by weight of a reinforcing silica filler having a surface area within a range of about 225 to 270 $M^2/g$ in a high-shear mixer,
   (B) maintaining the content of the mixer at a temperature within a range of about 20° C. to 50° C. while adding water, ammonium hydroxide and a silylating agent selected from a group consisting of hexamethyldisilazane, 1

,3-divinyltetramethyldisilazane, and mixtures thereof, in amounts sufficient to treat the silica, thereby forming an essentially homogeneous mixture comprising a treated reinforcing silica filler;

(C) adding to the mixer about 30 to 100 parts by weight of a diorganopolysiloxane having a viscosity of about 0.30 to less than 100 Pa.s at 25° C per 100 parts by weight of the reinforcing silica filler, the mixer providing sufficient shear to produce a flowable powdered base having an average particle size within a range of about 1 to 1000 microns, and (D) heating the flowable powdered base at a temperature within a range of about 100° C. to 200° C. under conditions sufficient to remove volatiles.

18. A composition prepared by the process of claim 17.

* * * * *